Feb. 25, 1941. J. PIZZO 2,232,865

HOOD CATCH ARRANGEMENT

Filed Dec. 10, 1938

Inventor
Joseph Pizzo
By Blackmore, Spencer & Flint
Attorneys

Patented Feb. 25, 1941

2,232,865

UNITED STATES PATENT OFFICE 2,232,865

HOOD CATCH ARRANGEMENT

Joseph Pizzo, Detroit, Mich., assignor to General Motors Corporation, Detroit, Mich., a corporation of Delaware Application December 10, 1938, Serial No. 244,873

3 Claims. (Cl. 292—41)

This invention relates to a hood catch arrangement or hood latching arrangement applied to the hood doors of automotive vehicles.

The invention is applicable to a hood door which is either hinged at its center and swings upwardly from the side or is hinged at its rear end and swings upwardly from the front of the vehicle.

The essential novelty of the invention resides in the provision at each side of the vehicle of a sliding member having two slides incorporated therein. Each slide is provided with a catch which is adapted to engage over a hook mounted on the swinging door of the hood. This side member preferably extends through the dashboard of the vehicle and is operated from the inside of the vehicle, and suitable springs constantly urge the members toward latching or hook engaging position. The invention has the additional feature of providing one or more springs equipped with wear members which wear members engage the hooks on the hood door when the hood door is locked, and when the latching or catching arrangement is released these springs will urge the hook members and the hood door slightly away from its latched position and also act when the hood is in locked position to prevent rattle of the parts.

Figure 1:
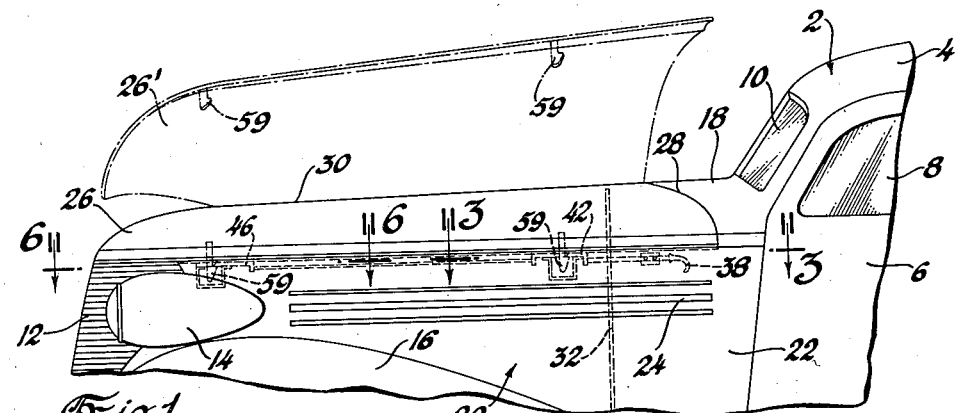
Figure 1 is a side view of a part of an automotive vehicle showing the invention applied to a door hinged at the cowl of the vehicle. The door shown in dotted outline is an optional type of door hinged at the center line of the hood and in which the invention may be applied.

Referring to the drawing, an automotive vehicle as a whole is indicated at 2. This vehicle has the top 4, the front door 6, the door window 8, the divided windshield 10, the radiator grille 12, the headlamp 14, front fender 16, cowl 18, and hood 20. These parts are in general conventional, and per se form no part of the invention. The latch mechanism on one side only of the hood is shown but it will be understood that the latch arrangement is duplicated on the other side.

The hood 20 has the permanent side part 22 provided with the usual louvers 24, and a hood door is shown at 26. This hood door is preferably hinged at the rear adjacent the line of division 28 of the cowl and hood and when the hood catch is released the front end adjacent the grille is raised to allow access to the engine compartment.

A second hood door is shown in dotted outline at 26' and is of the type which hinges along the center line 30 of the hood. The invention is applicable to either type of hood door.

The dashboard or shroud pan is indicated at 32 and is provided with an opening to receive a rubber or fabric grommet 34. The operating member of the hood catch or latching mechanism is indicated as a whole at 36 and comprises the handle 38 secured to the shank 40, the front slider 42, the connector rod 44 and the rear slider 46. The handle 38 is mounted in a bracket 47 secured to the side of the cowl. The front slider 42 is slidably mounted in bearings which are secured to the turned over flange or edge 48 of the stationary side 22 of the hood. The bearing comprises the stiffening or strengthening member 50, the brackets 52, the spacing rounds or washers 54 between the stiffener 50 and the bracket, and the machine screws 56. The flanges 58 on the brackets 52 have threaded openings to receive the threaded ends of the machine screws 56. Both the hood flange 48 and the stiffening member 50 have openings therein to allow the hooks 59 secured to the hood door to pass therethrough. The front slider 42 is provided with a front elongated slot 60 and a rear elongated slot 62. In the slots 60 and 62 the spacers or rounds 54 are received and these rounds are of slightly greater thickness than the thickness of the slider 42 so that when the handle 38 is moved to the right in Figures 1, 2, and 3, the shank 40 will be able to move the sliders so that the catch 64 intermediate the slots 60 and 62 may be moved away from the shoulder 66 of the hooks 59.

Figure 2:
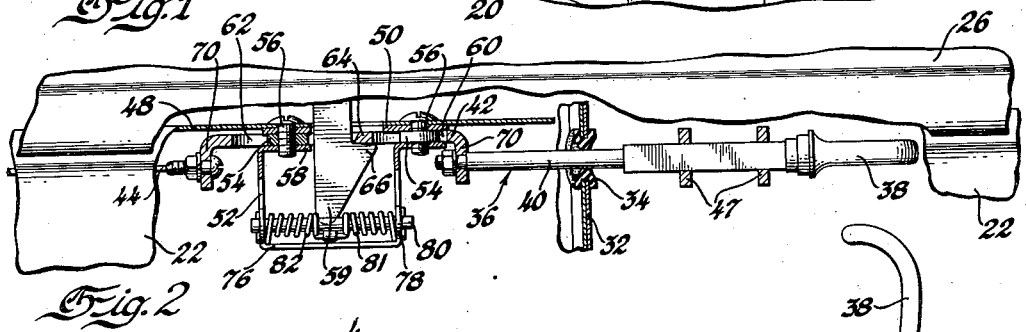
Figure 2 is an enlarged detailed view of the right end of the latching mechanism shown in Figure 1, parts being broken away and shown in section better to illustrate the invention.
Figure 5:
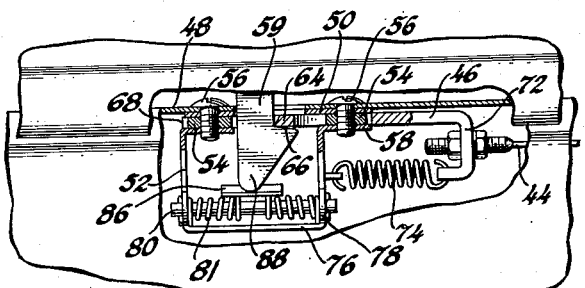
Figure 5 is a view similar to Figure 2 of the structure at the front of the vehicle.
Figure 6:
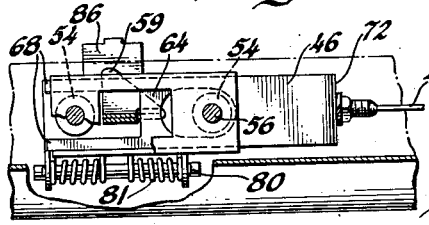
Figure 6 is a section on the line 6—6 of Figure 1.

The rear bearing shown in Figures 5 and 6 for the rear slider 46 is a duplicate of the bearing shown in Figures 1 and 2 for the front slider 42. The slider 46 differs from the front slider 42 in that the rear end thereof terminates in the tines 68 to form a fork which straddles the rear spacer or round 54.

The front slider 42 preferably has the downturned ends 70 to which the shank 40 and the rod 44 are attached as shown in the drawing, and the rear slider 46 has the downturned end 72 to which the rear end of the connector rod 44 is attached.

As shown in Figure 5, coil springs 74 are connected to the flange 72 and to the brackets 52 and are under tension and constantly pull the slider 46 to the left when considering Figure 5. In other words, the springs always urge the parts to the position shown in Figures 2 and 5.

Figure 3:
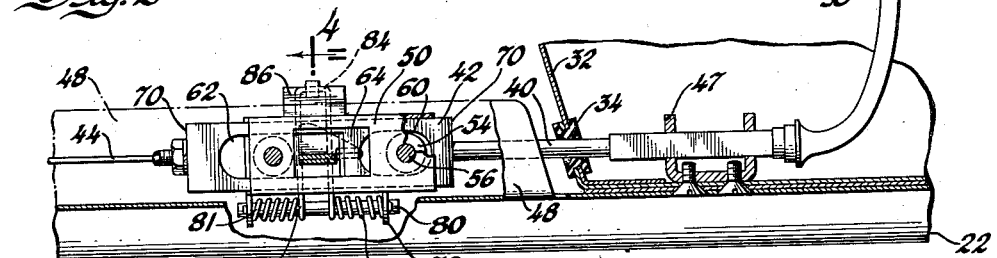
Figure 3 is a section on the line 3—3 of Figure 1.
Figure 4:
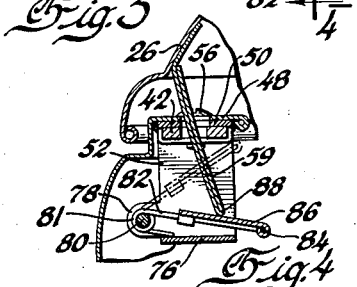
Figure 4 is a section on the line 4—4 of Figure 3.

In order to assist in raising the hood when the operator pulls the handle 38 to the right (Figures 1 and 2) to release the catch at 64 from the shoulder 66, the structure shown in detail in Figures 2 and 4 is used. The brackets 52 have the lower connecting web 76 and the lateral ears 78 and between the ears 78 a shaft 80 is secured. Around the shaft 80 there is positioned the coiled part 81 of a spring 82. The ends of this spring rest on the web 76 of the bracket while the center part extends between the bracket as shown in Figure 4 and is formed into a loop indicated at 84 in Figure 3. This loop has secured thereto the wear member 86 against which the point 88 of the hook 59 is adapted to strike when the hook passes through the openings in the flange 48 and stiffening member 50 to pass under the catch. This striking of the wear plate 86 by the hook 59 will further wind up and increase the strength of the spring 82 and thereby cause the wear member constantly to be urged upwardly against the end of the hook and keep the hook tightly in engagement with the catch 64. When the operator pulls the handle 38 to the right to release the catches 64 from the shoulders 66 of the hooks, the springs 82 will push upwardly on the hooks to force the hood door open for a short distance to enable the operator to insert his hands and raise the door the remainder of the distance. Preferably, each bracket is provided with one of the devices used for raising the hood and preventing rattle of the parts.

Assuming the parts to be in the position shown in Figures 2 and 3 and the driver of the vehicle wishes to raise the hood door, he will pull the handle 38 toward him from the driver's seat. This movement will pull the catches 64 away from the shoulders 66 of the hooks and allow the springs 81 to raise the hood slightly. The handle 38 may now be released and by leaving the vehicle the driver may place his fingers under the edge of the hood door to raise the same. Upon lowering the hood door, the hooks 59 may be forced under the catches 64 by pressing downwardly on the door to cause the catches 64 to yield against the tension of the spring and snap over the shoulders 66.

I claim:

1. In a latching mechanism for the hood door of an automotive vehicle, means slidably mounted on a stationary part of the vehicle adjacent the edge of the hood door, said means including a plurality of sliders mounted intermediate thereof, a catch on each slider, a plurality of hooks on the door, one hook for each slider, said hooks adapted to engage under the slider when the hood door is lowered to hold the door in lowered or latched position, and means inside the vehicle to slide said means to disengage the sliders from the hooks to enable the hood door to be raised.

2. In a latching mechanism for the hood door of an automotive vehicle, said hood having a stationary side wall, slidable means mounted at the upper edge of the stationary wall, including a plurality of sliders mounted intermediate said means, a catch on each slider intermediate the ends thereof, a plurality of hooks on the door, one hook for each slider, each of said sliders having an opening and said hooks adapted to pass through said openings and underneath the catch when the hood door is in lowered position to hold the door in latched position, and means to operate said means to release the catches from the hooks to enable the door to be raised.

3. In a latching mechanism for the hood door of an automotive vehicle, said hood having a stationary side wall, slidable means at the upper edge of the stationary wall, including a plurality of sliders mounted intermediate said means, said sliders serving as bearing elements of said means, bearings in which the sliders are mounted, a catch on each of said sliders, a plurality of hooks on the door, one hook for each slider, said hooks adapted to engage under said catches when the door is in lowered position to hold the door in latched position, and means to operate said means to release the catches from the hooks.

JOSEPH PIZZO.